Dec. 15, 1964  N. R. TIMARES ETAL  3,161,120
APPARATUS FOR BRINGING RIBBON-TYPE MEDIA TOGETHER
Filed Feb. 25, 1963  4 Sheets-Sheet 1
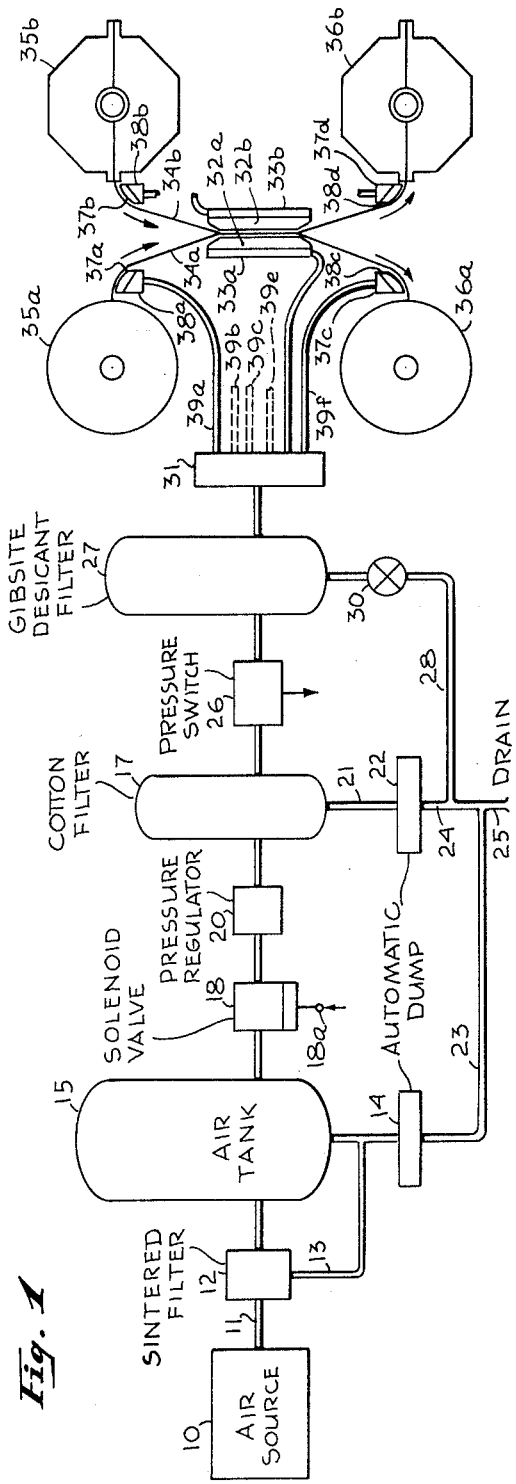
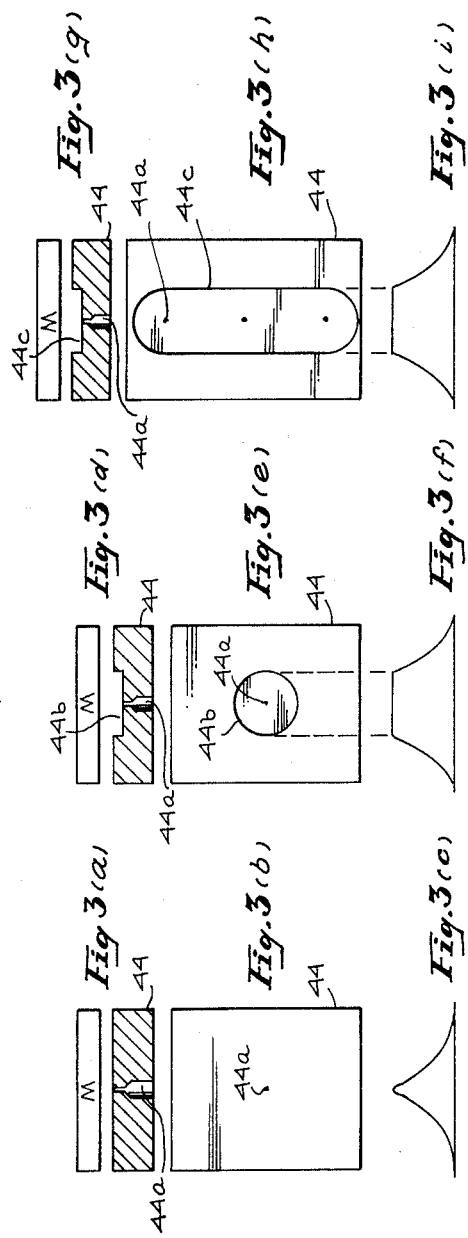
INVENTORS
ROBERT F. KIDDLE
NORMAN R. TIMARES
BY Allen E. Botney
ATTORNEY Dec. 15, 1964    N. R. TIMARES ETAL    3,161,120
APPARATUS FOR BRINGING RIBBON-TYPE MEDIA TOGETHER
Filed Feb. 25, 1963    4 Sheets-Sheet 2

ROBERT F. KIDDLE
NORMAN R. TIMARES
INVENTORS

BY *Allen E. Botney*

ATTORNEY

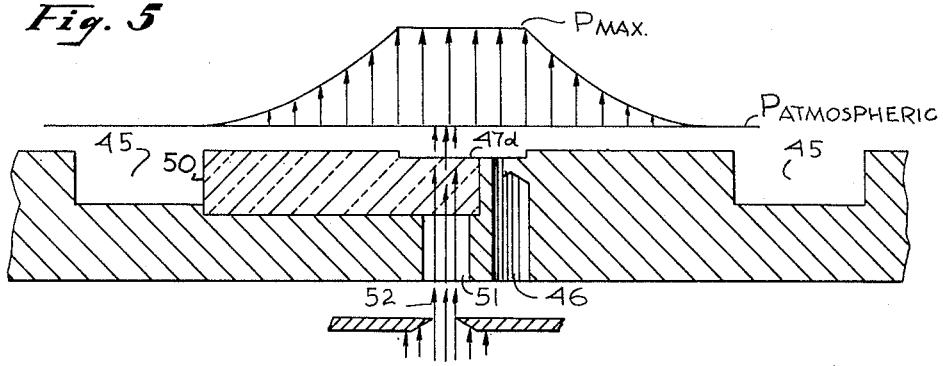
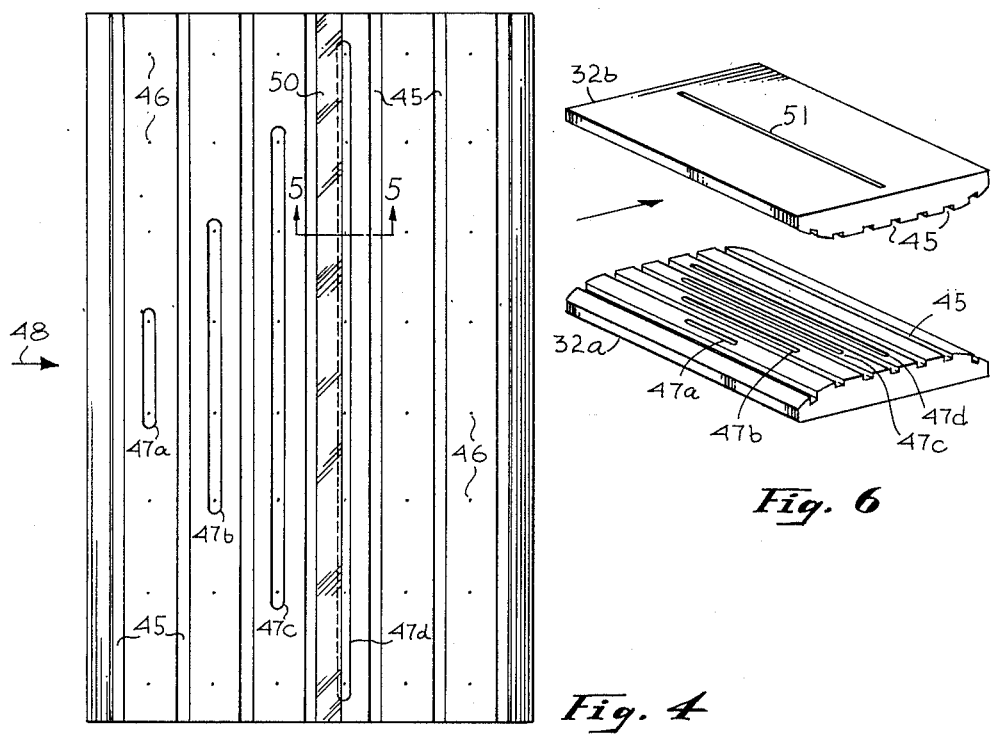
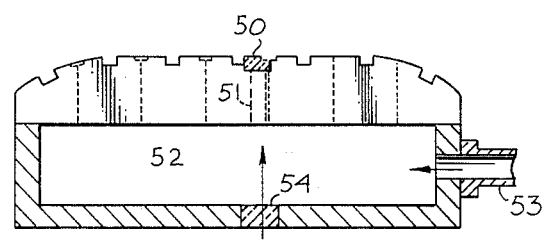

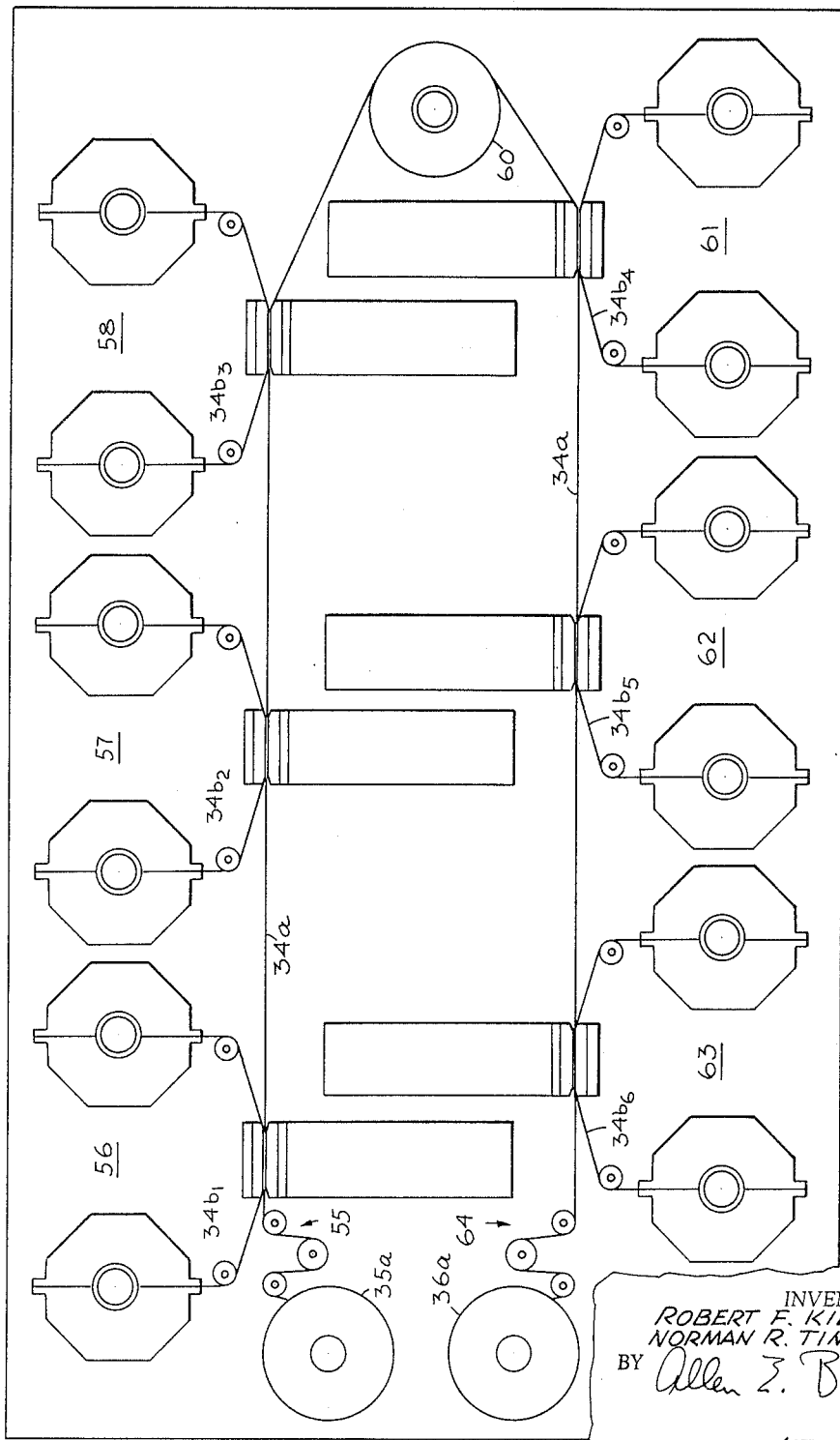

United States Patent Office

3,161,120
Patented Dec. 15, 1964

3,161,120
APPARATUS FOR BRINGING RIBBON-TYPE
MEDIA TOGETHER
Norman R. Tinares, Woodland Hills, and Robert F.
Kiddle, San Pedro, Calif., assignors to FMA, Inc.,
El Segundo, Calif., a corporation of California
Filed Feb. 25, 1963, Ser. No. 260,723
13 Claims. (Cl. 95—75)

The present invention relates in general to apparatus by means of which two lengths of material, such as two reels of photographic film, magnetic tape, paper, and the like, are tightly brought together in face-to-face relationship, and more particularly relates to apparatus of the kind mentioned in which air pressure is used both to support the lengths of material and to bring them tightly together.

It should be noted and recognized at the outset that the subject invention has general applicability in that it can be used with any ribbon-type media, such as photographic film, magnetic tape, plastic tape, paper tape, and the like. However, notwithstanding its broader or more general applicability, in order to more clearly set forth the novel aspects and features of the invention and, also, because it has proven to be particularly advantageous in its use with photographic film, the preferred embodiment of the invention to be described below is one adapted for use with this kind of media, namely, photographic film. However, in reading through the description that follows, it should at all times be kept in mind that with but slight modification, the preferred embodiment can be adapted for use with ribbon-type media of another kind, such as the magnetic tape, paper tape, and plastic tape mentioned above.

In the parlance of the photographic arts, the process for transferring information or data from a film negative to an unexposed film is known as "Printing" and, as may be expected, the apparatus that performs such a function is called a "Printer." In printing, the two lengths of film involved are brought together in face-to-face relationship over a relatively small portion of their lengths and, whereat they are together, light is passed through them both. As a result, the previously unexposed film has now been exposed, the information content of the film negative having thereby been transferred to it. Thus, in essence, the photographic printing process described in general terms above is a duplication process in which one length or reel of film negative is produced from another.

Printers today are either of the drum or roller type, the films being wound around a portion of the drum or around and between the rollers for the purpose of tightly packing them together, this being necessary in order to bring the emulsions on the faces of the two films as close together as possible. Although printers like those mentioned do the job, that is to say, produce duplicates of the original, they leave much to be desired.

First, machines of this sort present formidable speed control and velocity synchronization problems. More specifically, each of the two reels of film has its own drive with the easily recognized result that somehow the two drives must be synchronized or made to operate in unison so that the films may move together. However, the problem is complicated by the fact that the films are wound together on a drum or on rollers. By so doing, the linear velocity of the outer film tends to be slightly different from that of the film beneath it, and the linear velocities of the films, in turn, tend to be slightly different from the linear velocity associated with the outer surface of the drum. Consequently, complex and expensive apparatus is required and must be furnished in order to monitor the film drives and the film-drum or film-roller arrangement for proper speed control and synchronization. Furthermore, the use of drums or rollers and the resulting curvatures of the film introduces a scale change problem. More particularly, information transferred to the copy film is spread over a larger area than the original area on which the information was contained, that is to say, a somewhat larger area of the outer film is exposed than was exposed on the film beneath it. Stated differently, an element of data on an area of the film negative is transferred to or duplicated on a somewhat larger area on the unexposed film. Hence, present day printing techniques result in a loss of data density which is magnified as each copy thusly made is, in turn, used as an original from which another copy is made. Consequently, a significant amount of very fine detail will, in this way, ultimately be lost. A third disadvantage of present day printers is that the film is forced to slide or rub against metal or other surfaces during a portion of the time, with the result that the film eventually becomes scratched, thereby reducing the clarity and legibility of the data recorded on it. Scratches and other imperfections caused in this manner are of particular concern where very fine detail is involved.

Only a few of the many shortcomings of present day printer apparatus have been delineated and briefly explained. However, they should have made clear that there has been a longfelt need for a new approach to the printer machine art.

The present invention provides either a complete or a substantial solution to the problems encountered and, in accordance with the concept of the present invention, this is achieved by using air pressure to force the films together and to support them. More specifically, the films are made to pass between a pair of plates, hereinafter referred to as air platens, containing orifices through which air is forced against the two lengths of film. To insure satisfactory film support and to maintain good contact between them, the pressure distribution is the same for both, which entails not only regulation of the air pressure within narrow limits but also strict adherance to experimentally determined design factors for the construction and spacing of the air platens. Furthermore, to prevent the erosion of the film and thereby extend its life, the air is thoroughly filtered or cleansed before it is brought into contact with the film. Air bearings may also be used to support the individual films at various points, the combination of air platens and air bearings making it possible to entirely support the films on cushions of air.

The use of air pressure to bring the films together in firm contact and to support them has a number of advantages. First and most obvious, air support eliminates any contact between the film and other surfaces, thereby insuring that the quality of the film will not be degraded because of scratches or other imperfections caused by such contacts. Even where the film is only partially supported by air, as where air platens are used but rollers substituted for the air bearings, it has been found that the quality of the film is nevertheless maintained to a very marked degree. Second, since the use of drums and rollers for the purpose of bringing the films into close contact are avoided, the films can be kept flat during their contacting portions, thereby very substantially eliminating the scale problem previously described. Third and most significant, it has been discovered that the pressurized air brings the films together in such close and firm contact that one film can be used to pull the other film along, that is to say, to effectively drive the second film without slippage. Thus, the present invention permits the elimination of one of the two film drives required in the prior art. It will be recognized from the fact that in the present invention the films move in a plane while they are in contact with each other and from the fact that in the present invention one film drives the other so that both move as one, that speed control and velocity synchronization, previously important problems, are automatically resolved and, therefore, pose no problems at all in machines that embody the present invention.

Because they are too numerous to completely list and explain, only a few of the many benefits that may be derived from the present invention have been presented here. Accordingly, the novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIGURE 1 is a block diagram or schematic presentation of apparatus, constructed in accordance with the present invention, for bringing two lengths of film together in close face-to-face contact;

FIGURES 3a–3i illustrate important constructional and operational features of the present invention with respect to air pressure distribution;

FIGURE 4 is a top view of an air platen constructed in accordance with the present invention;

FIGURE 5 is an enlarged cross-sectional view of a portion of the air platen shown in FIG. 4 taken in the direction of arrows 5—5;

FIGURE 6 illustrates the appearance of and the physical relationship between a pair of air platens;

FIGURE 7 is a general cross-sectional view of an air platen together with a support and air supply member mounted to it; and FIGURE 8 is a block diagram or schematic representation showing the manner in which the present invention can be used as a multiple printer, that is to say, how it can be used to simultaneously produce a large number of reproductions of a film negative.

Figure 2:
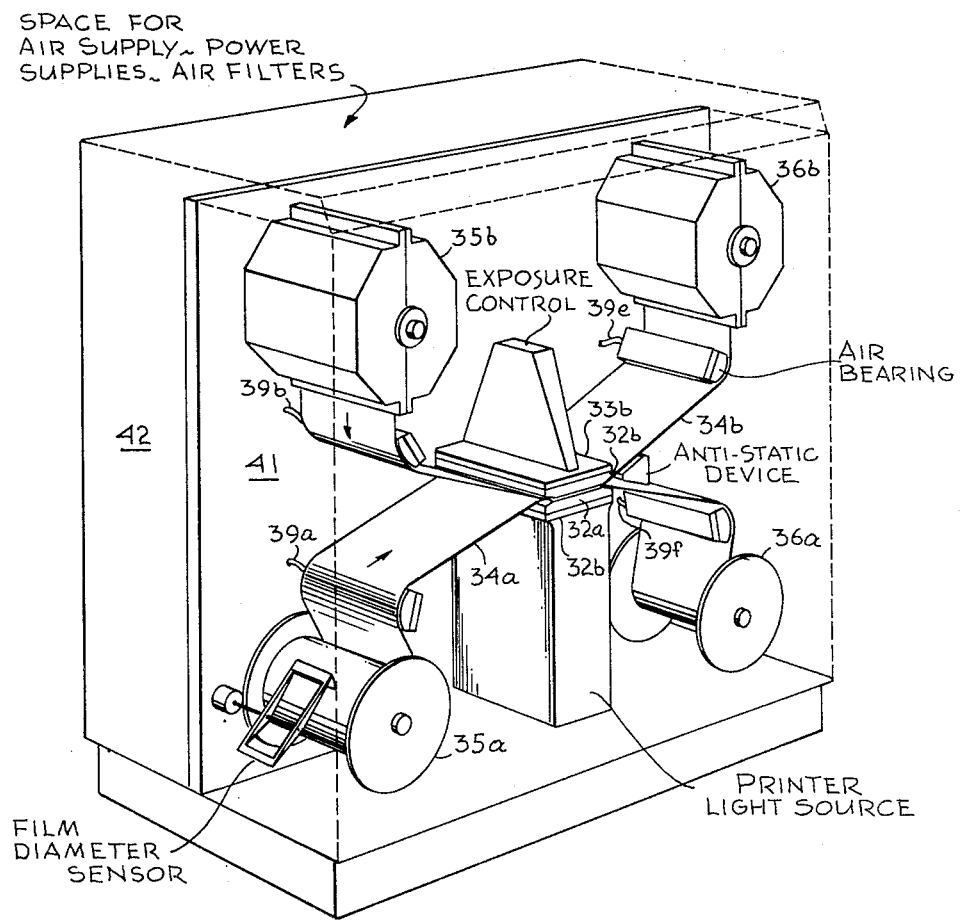
FIGURE 2 is a high resolution film printer embodying the arrangement of FIG. 1.

Referring now to the drawings and in particular to FIG. 1 therein, an air source 10 is shown coupled by means of an air supply line 11 to a first air filter 12, preferably a sintered filter. Air source 10 may be an air compressor which, as is well known, draws in air from the surrounding atmosphere and later ejects the air under pressure. In the present instance, the preferred pressure for the air coming out of the compressor is 150 p.s.i. As the air from the compressor passes through sintered filter 12, water, oil and dirt particles are extracted from it, the impurities mentioned thereafter settling via connecting pipe 13 in an automatic dump receptacle 14.

The air out of filter 12 is fed to an air tank 15 which holds or stores relatively large amounts of the air under the same pressure, namely, 150 p.s.i., the air tank in this way performing the function of a flywheel in that it dampens or takes out the pulsations produced by the compressor. Due to the lower temperatures existing in the air tank, condensation will occur, with the result that water and oil particles will ultimately drop to the bottom of the tank and thereafter become deposited, via connecting pipe 16 in dump receptacle 14. The air obtained from tank 15 is fed to a second air filter 17 which, this time, is preferably a cotton filter, a solenoid valve 18 and a pressure regulator 20 being interposed in the line between the two. Solenoid valves and pressure regulators of the type used herein are well known and commercially available so that a detailed description of them is not deemed necessary. Suffice it to say, therefore, that solenoid valve 18 is connected to external circuitry that will apply a signal at its input terminal 18a should the film tear or break and, in response to such a signal, the solenoid valve will shut off the flow of air in the line. Pressure regulator 20, on the other hand, reduces the pressure of the air from 150 p.s.i. to 40 p.s.i. gauge so that the air is at the lower of these pressures when it reaches filter 17. Due to the pressure drop at this point in the line, still more condensation occurs and the water thusly formed is taken out by cotton filter 17, the water as well as oil and dirt particles eventually finding their way through a pipe 21 to another automatic pump receptacle 22. The output ends of dump receptacles 14 and 22 are respectively connected by pipes 23 and 24 to a drain pipe 25, the impurities deposited in receptacles 14 and 22 being emitted from the system through these pipes.

Following cotton filter 17, the air passes through a pressure switch 26 to a final filter 27 which is preferably a 5 micron dessicant gibsite type of filter. This type of filter is preferred in the final filter stage because, as was already implied, it will only permit particles or impurities of less than 5 microns in diameter to pass through it. Accordingly, the air emerging out of filter 27 is quite clean. However, any impurities trapped by filter 27 are passed through a pipe 28 which ultimately connects to drain pipe 25 where these impurities are passed out of the system. A valve 30 is connected in the pipe line 28 to prevent any feedback of air through filter 27 should the air pressure in the main line of the system be drastically reduced for some reason. In this regard, pressure switch 26 is inserted as an additional safeguard for, in the event the pressure drops below a preset level that is insufficient to support the film, the pressure switch will generate a signal that will be applied directly to the transport portion of the system which, in response to this signal, will immediately shut down to prevent any damage to the film.

The pure air emerging from filter 27 enters a manifold 31 wherein the air is equally distributed among a number of pipes or hoses which intercouple the manifold with a plurality of air bearing and air platen arrangements. More specifically, there are two air platen arrangements and each is made-up of two parts, mainly, an air platen and a platen support and air supply member, one air platen and its associated support and air supply member respectively being designated 32a and 33a and the other air platen and platen support and air supply member respectively being designated 32b and 33b. As shown in the figure, air platens 32a and 32b face each other, the moving films, designated 34a and 34b, passing midway through the space between them. Films 34a and 34b, one of which is a film negative and the other of which is an unexposed film, are respectively wound on supply reels 35a and 35b and are being wound upon take-up reels 36a and 36b. As will be seen later, air platens 32a and 32b include a plurality of orifices through which air under pressure is forced against films 34a and 34b, respectively, the cushions of air thusly formed and pressing against the sides of the films thereby providing the force needed to bring them into face-to-face contact as well as to support them as they move along at high speed. Support and air supply members 33a and 33b are respectively mounted on the backsides of air platens 32a and 32b and, in addition to providing mechanical support for the air platens, the primary function of these members is to provide a proper distribution of the pressurized air to the abovesaid orifices in the air platens.

Like the air platen arrangements, each of the air bearing arrangements includes an air bearing and a bearing support and air supply member to which the air bearing is affixed. Four air bearing arrangements are shown in FIG. 1, the air bearings therein respectively being designated 37a–37d and the associated bearing support and air supply members respectively being designated 38a–38d. As is also shown in the figure, air bearings 37a–37d are positioned to support films 34a and 34b between the several reels and the air platens. For this reason, air bearings 37a and 37b are respectively positioned in the proximity of supply reels 35a and 35b and support the films as they leave these reels and move in a curved path toward the air platens. Similarly, for the purpose of supporting the films as they leave the air platens and approach the take-up reels, air bearings 37c and 37d are respectively positioned in the proximity of take-up reels 36a and 36b. In fulfillment of their supporting roles, air bearings 37a–37d, like the air platens, include a plurality of orifices through which air under pressure is forced against the sides of films 34a and 34b, the cushions of air thusly formed providing the desired support for them. As previously mentioned, bearing support and air supply members 38a–38d are respectively mounted on air bearings 37a–37d and not only provide physical support of the air bearings but also provide the pressurized air to the orifices therein.

To supply air under pressure to members 33a and 33b, which are associated with the platens, as well as to members 38a–38d, which are associated with the bearings, the apparatus of FIG. 1 is shown to further include a plurality of pipes or hoses 39a–39f that intercouple the respective members to the outlets of manifold 31. More specifically, hoses 39a and 39b are respectively connected to air supply members 38a and 38b, hoses 39e and 39f are respectively connected to air supply members 38d and 38c, and hoses 39c and 39d are respectively connected to members 33b and 33a. However, the order in which the hoses are connected to the air supply members is not in any way critical so that a different connecting order would be equally suitable and practical.

A more practical and realistic arrangement of the elements of a printer machine that embodies the present invention is shown in FIG. 2 to which reference is now made. As shown, the machine is partitioned to form two chambers designated 41 and 42, the elements actually or directly engaged in the printing process being housed in chamber 41 and the auxiliary equipment, such as the power supplies, the air filters and air supply apparatus, etc., being housed in chamber 42. Power supplies are standard pieces of equipment and the air supply and air filter apparatus has already been shown in FIG. 1 and fully described. Accordingly, to avoid any unnecessary complication of the drawings and thereby expedite an understanding of the invention itself, the aforesaid auxiliary equipment is not shown in chamber 42.

Shown mounted in chamber 41, on the other hand, are supply and take-up reels 35a and 36a, respectively, and film negative 34a moving therebetween, as well as supply and take-up reels 35b and 36b, respectively, between which unexposed film 34b is moving. As is shown in the figure, in order to shield and thereby protect the unexposed or unprocessed film, reels 35b and 36b are respectively enclosed in cassettes which are hereinafter included in the numerical designations 35b and 36b. Air bearings 37a–37d and their associated support and air supply members 38a–38d are also clearly shown in the figure, as well as the final portions of hoses 39a, 39b, 39e and 39f. The air platen arrangements are centrally mounted, with air platens 32a and 32b in close face-to-face relationship and mounted on support and air supply members 33a and 33b positioned behind them, as previously mentioned. As shown, films 34a and 34b pass on the outside of air bearings 37a–37d but pass between air platens 32a and 32b.

With respect to the remaining equipment shown in FIG. 2, suffice it to say that while they are or may be used in the printing process, they are not at all pertinent to or in any way included as a part of the present invention. Accordingly, it is not deemed necessary to describe such apparatus in any detail. Such apparatus, for example, would include printer light source and exposure control equipment and may also include a film diameter sensor and an anti-static device. As their names imply, the sensor would measure the diameter of the film on the reels, information that may be needed for control purposes, and the anti-static device would eliminate or neutralize the static electricity on the films as they emerge from between platens 32a and 32b. It should be noted with respect to both the film diameter sensor and the anti-static device that they can be constructed to incorporate the features of the present invention, that is to say, they can be constructed to include air bearings so that the film is never touched by them. Thus, as has already been mentioned and which should be mentioned here once again for purposes of emphasis, a significant feature of the present invention is that films 34a and 34b never come into contact with any other surface from the time they leave reels 35a and 35b to the time they become wound upon reels 36a and 36b. This will be recognized from an examination of the structure shown in FIG. 2.

Before proceeding to a detailed description of the air platen arrangements, it is deemed important to first provide an understanding of the phenomena involved in the successful operation of the air platens and, therefore, of the air bearings as well. Accordingly, reference is made to FIGS. 3(a)–3(i) wherein illustrative drawings are found showing a mass M supported by air under pressure flowing through one or more orifices and directed against the mass. In particular, in FIG. 3(a), a mass M is shown positioned above and in face-to-face relationship with a member 44 having an orifice 44a through which the supporting air flows. A top view of member 44 and its orifice 44a is shown in FIG. 3(b), and from both figures it can be seen that the exit end of orifice 44a is circular and in the plane of the top surface of member 44. As a result of these two facts, namely, that the top or exit end of the orifice is round and flush with the upper surface of the member, the pressure distribution of the air in the space between the mass and the member is as shown in FIG. 3(c), from which it can be seen that the pressure exerted against mass M is at a peak or maximum above the center of the orifice but that it decreases very rapidly with distance from this point.

The combination of mass M and member 44 is presented once again in FIG. 3(d), member 44 in FIG. 3(d) differing from member 44 in FIG. 3(a) in only one respect, namely, member 44 now has a recess or set-back area 44b into which orifice 44a opens. As a result, the air leaving orifice 44a first spreads throughout recess 44b before it impinges upon the bottom side of mass M. A top view of member 44 in FIG. 3(e) clearly shows the circular configuration of recess 44b and orifice 44a centered therein. As a result of the recess being included in member 44, an entirely different pressure distribution is produced in the space between mass M and member 44 than was heretofore obtained, this new pressure distribution being illustrated by means of the curve in FIG. 3(f). As shown, the curve is flat for the full width of recess 44b, which indicates that a constant pressure is exerted against the surface area of mass M that faces recess 44b. As before, the pressure drops off sharply with increasing distance from the recess.

A modified member 44 that involves the same principles as delineated in connection with member 44 in FIGS. 3(d)–3(f) is shown in FIGS. 3(g) and 3(h). More particularly, instead of the circular recess or set-back area found in member 44 of FIGS. 3(d) and 3(e), member 44 of FIGS. 3(g) and 3(h) has an elongated recess or set-back area 44c and a plurality of three orifices 44a entering thereupon. However, notwithstanding the differences mentioned, it can be seen from the curve in FIG. 3(i) that the pressure distribution in the space between mass M and member 44 remains the same, that is to say, the pressure exerted against mass M throughout the entire surface area thereof that faces recess 44c is constant. As will be seen below, this phenomena is made use of or incorporated in platens constructed in accordance with the present invention.

Accordingly, with this basic information in mind, reference is now made to FIG. 4 wherein a top view of an air platen shows that it has a plurality of grooves or slots in its upper or top surface, such as slot 45, that extend for the full length of the platen. Slots 45 are preferably parallel to each other and to the sides of the platen and are included for air release purposes, that is to say, to provide routes by means of which the pressurized air may flow easily from out of the space between the platen and the film. FIG. 4 also shows that an air platen has a relatively large number of orifices 46 through it and that these orifices are preferably arranged in rows and columns, a column of orifices being disposed midway between each adjacent pair of slots 45 or midway between a slot and the side of the platen. In accordance with the principles set forth or explained in connection with FIGS. 3($a$)–3($i$), an air platen is also shown to include a number of elongated recesses or set-back areas 47 whose lengths are preferably graduated. The air platen illustrated in FIG. 4 includes only four such recesses and these are designated 47$a$–47$d$, the smallest recess being designated 47$a$ and the longest recess being designated 47$d$. It will be obvious from arrow 48, which indicates film direction, that the film approaching and then entering the space between the air platens will first encounter the shortest elongated recess, namely, recess 47$a$, then the next smallest recess 47$b$, then the next to the longest recess 47$c$, and finally the longest of the elongated recesses, namely, recess 47$d$. Recesses 47$a$–47$d$ are disposed midway between adjacent pairs of slots 45 and parallel to them. Furthermore, as in FIGURE 3($h$), each of the recesses in FIG. 4 has orifices opening into it so that, as was already explained, air under pressure from those orifices will enter and spread throughout these recesses to thereby provide the uniform or constant distribution of pressure throughout their length and breadth.

Finally, an air platen includes a glass bar or glass plate 50 that is mounted in the top of the platen, one side of the glass bar extending into or, stated differently, overlapping elongated recess 47$d$. As will be seen later, glass plate 50 is flush with the top surface of the air platen except as to that portion of the glass bar that extends into recess 47$d$ and as to that portion it is flush with the top surface of the recess. As will also be seen later, beneath the glass bar 50 is a slotted opening and it is by means of the glass bar and the slotted opening beneath it that light is able to pass through the air platen to become incident upon the film.

It should be mentioned here that although only four recesses 47$a$–47$d$ are shown in the air platen of FIG. 4, more than or fewer than this number of recesses may be used, depending upon the use to which the air platens are put, that is to say, according to need. Similarly, a greater or lesser number of orifices 46 than that shown in the figure may be utilized.

A cross-sectional view of a small portion of the air platen shown in FIG. 4, more specifically that portion of the air platen that includes glass insert 50, is presented in FIG. 5. Recess 47$d$ and slots 45 on either side of it, as well as orifices 46 entering or opening into recess 47$d$, are clearly illustrated. Also clearly shown in FIG. 5 is glass bar 50 which, as can be seen, extends from the border of slot 45 on the left almost to orifices 46 in recesses 47$d$. As was previously mentioned, that part of glass bar 50 that extends into and is a part of recess 47$d$ is stepped down so that it will be flush with the top surface of the recess. The rest of the glass bar, that is, the portion between slot 45 and recess 47$d$, is flush with the top surface of the air platen. As was also previously mentioned, the air platen is slotted through beneath that portion of glass bar 50 that extends into recess 47$d$ so that light may pass through the air platen, the slot through the air platen being designated 51 and the beam of light passing through it being designated 52. Positioned immediately above the cross-sectional view of the air platen is a pressure distribution curve that presents a picture of the variations of pressure in the space between slots 45. As the curve clearly illustrates, the pressure above recess 47$d$ is uniform, as desired, whereas between recess 47$d$ and slots 45 the air pressure decays rapidly toward atmospheric pressure.

Air platens 32$a$ and 32$b$ are shown once again in face-to-face relationship in FIG. 6. The exact shape or configuration of the air platens, which was not visible in either of FIGS. 1 or 2, is made available in this figure. In addition, it should be noted that the spacing between the platens illustrated in FIG. 6 is greatly exaggerated. For example, in a typical situation the spacing between platens 32$a$ and 32$b$ would be 0.013 inch and since the combined width of the two films is 0.011 inch, this means that the spacing between an air platen and the film nearest it is only 0.001 inch.

A cross-sectional view of an air platen together with a platen support and air supply member is shown in FIG. 7 to which reference is now made. As shown therein, the support and air supply member is generally U-shaped and, therefore, together with the air platen mounted over it, forms a chamber 52 into which the air under pressure enters before flowing through the orifices in the platen. The air enters chamber 52 by means of a hose 53 which is of the same type as hoses 39$a$–39$f$ in FIGS. 1 and 2. Glass insert 50 is clearly shown in FIG. 7 as well as slot 51 through the platen. Since a light beam would have to pass through the support and air supply member in order to reach slot 51, a glass bar 54 is also mounted in the wall of the member directly beneath slot 51. In other words, a portion of the wall of the support and air supply member is replaced with a bar of glass that is at least of the same width as slot 51 and aligned with it. Thus, slot 51 and glass bars 50 and 54 provide a path for the light beam that must be applied to the films, namely, films 34$a$ and 34$b$ in FIGS. 1 and 2, during the printing operation.

Having thus described the construction and operation of an air platen arrangement, it must be mentioned that an air bearing arrangement is constructed and operates in the same manner, the only difference between the two being one of shape or design. Thus, merely by way of example, while the preferred design of an air platen is such that it is rounded along its sides and flat in the center, thereby giving it an oblong appearance, an air bearing will have a circular design in that its top surface will more than likely follow the arc of a circle. However, aside from these superficial differences, air platen and air bearing arrangements are the same. Consequently, the description presented above of an air platen arrangement is equally applicable to an air bearing arrangement.

It should also be mentioned that rollers may be substituted for the air bearing arrangements without detracting too much from the advantages of the present invention which, it should be clear by now, are primarily obtained through the use of the air platen arrangements. Thus, rollers could be substituted for air bearings 37$a$–37$d$ in the system presented in FIGS. 1 and 2. Finally, it should be mentioned once again by way of emphasis that the present invention brings the films together so tightly that only one film drive need be employed as compared to the two film drives previously required. In other words, one film drive suffices for both reels of film in that one film pulls the other film along with it in unison.

Above and beyond the many advantages derived from the present invention, as delineated above, there is still the very important further advantage of being able, with the aid of the present invention, to simultaneously print or produce a number of copies of a film original. An arrangement for achieving such a result is illustrated in FIG. 8, the arrangement shown therein being adapted to print or produce six copies of film 34$a$. As before (see FIGS. 1 and 2), the supply and take-up reels for film negative 34$a$ are reels 35$a$ and 36$a$, respectively. From supply reel 35a, film 34a moves over a roller arrangement generally designated 55 and thereafter, in succession, passes between the air platens of three printer machines positioned in tandem. These printer machines are generally designated 56, 57 and 58. Upon leaving printer machine 58, film negative 34a passes over a return roller 60 which reverses the direction of the film and heads it toward take-up reel 36a. Following roller 60, film 34a successively passes between the air platens of three more printer machines that are also positioned in tandem, these latter machines being generally designated 61, 62 and 63. Upon leaving machine 63, film 34a passes over a final group of rollers, generally designated 64, and then returns to take-up reel 36a upon which it becomes wound.

It will be recognized that each of the printer machines shown in FIG. 8, together with film 34a and its auxiliary apparatus, such as reels 35a and 36a and rollers 55 and 64, is as complete a printer machine as the one shown and described in FIGS. 1-7. Thus, films $34b_1$, $34b_2$ and $34b_3$ of machines 56, 57 and 58, respectively, are made into exact copies of film 34a and, similarly, films $34b_4$, $34b_5$ and $34b_6$ of printer machines 61, 62 and 63, respectively, are likewise made into exact duplicates of film 34a. Here again, as in the case of a single printer machine, film 34a is able to pull along with it and without slippage each of the other six films, with the result that here again, in this much larger arrangement, only a single film drive is needed. It will also be obvious to those skilled in the art that only a single air supply system of the kind shown in FIG. 1 need be employed since by appropriate enlargement of the capacity and of the number of its connecting hoses, it can be connected to and used with all six printer machines. Of course, the various other benefits derived from the present invention are equally true and applicable for each of the printers in this larger apparatus. It should also be noted that while six printer machines are shown in the system of FIG. 8, fewer or larger numbers of them may be combined to form such a system.

Although a particular arrangement or embodiment of the invention has been illustrated and described, it is not intended, as has already been mentioned, that the invention be limited thereto. Specifically, the present invention may readily be adapted for use in bringing together and supporting any two lengths of ribbon-type media. Accordingly, the invention should be considered to include any and all modifications, alterations or equivalent arrangements falling within the scope of the annexed claims.

Having thus described the invention, what is claimed is:

1. Transport apparatus for ribbon-type media comrising: a pair of spaced air-platen members mounted in face-to-face relationship and having identical patterns or orifices therethrough that are respectively in registration with each other; a first ribbon-type medium disposed between said pair of members; mechanical drive apparatus for moving said first ribbon-type medium through the space between said pair of members; a second ribbon-type medium disposed between said pair of members and in face-to-face relationship with said first ribbon-type medium; and means both for supporting said first and second media substantially midway between said members and for driving said second ribbon-type medium through the space between said pair of members in unison with said first medium, said means including air directed orthogonally against the sides of said first and second media with sufficient force to press them tightly together, whereby they move in unison, and apparatus for forcing said air through said patterns of orifices with substantially equal pressure to support and maintain said media midway between said members.

2. Transport apparatus for ribbon-type media comprising: a pair of air-platen members in face-to-face relationship with the ribbon-type media moving therebetween, each of said members including identical patterns of pinhole type orifices therethrough that are respectively in registration with each other and through which air under equal pressure is forced, said orifices being shaped and oriented to direct the air in a normal direction against the sides of the media; first and second ribbon-type media in face-to-face relationship moving in unison substantially midway between said air-platen members; means for driving said first media; apparatus for forcing air through said orifices at a pressure sufficient to press said first and second media together so that said first media drives said second media in unison with itself, said apparatus including a pair of platen support and air supply members respectively mounted on said pair of air-platen members for distributing said pressurized air to said orifices.

3. The transport apparatus defined in claim 2 wherein the orifices through each of said air-platen members are arranged in rows and wherein each air-platen member is slotted between rows of orifices for channeling the pressurized air from out of the space between said first air-platen members.

4. The transport apparatus defined in claim 2 wherein corresponding orifices through said air-platen members are recessed in the surfaces thereof that face each other.

5. The transport apparatus defined in claim 3 wherein a portion of selected rows of orifices through said air-platen members are recessed, the recessed portions facing each other and being identically graduated in length.

6. A film printer machine comprising: a pair of plate-like members in face-to-face relationship having identical patterns of orifices therethrough, said members including means mounted therein for passing a beam of light therethrough; a reel of film negative and a reel of unexposed film disposed in face-to-face relationship between said pair of members; a drive mechanism for moving one of said films; apparatus for forcing air through said orifices at a pressure sufficient to press said films together between said members such that said one film moves said other film in unison with it.

7. The machine defined in claim 6 wherein the orifices through said members are arranged in rows and columns and wherein each member is slotted between columns of orifices for channeling the pressurized air from out of the space between said members and said films.

8. In a machine by means of which ribbon-type media are supported and transported together apparatus comprising: a pair of spaced-apart plate-like members in face-to-face relationship and between which the media are disposed, each of said members having rows of orifices therethrough through which air is forced and slots between the rows for facilitating a flow of air from between said members, said orifices being shaped and oriented to direct the air orthogonally against the media, some of the orifices through each member being recessed in a pattern that is the same for both members; and means mounted on each of said members for supplying air under equal pressure to the orifices thereof, said means, together with its associated member, forming a chamber into which the air is forced for substantially equal distribution to the orifices coupled thereto.

9. The apparatus defined in claim 8 wherein the recessed orifices in each row form a single elongated recess, the elongated recesses of each member being graduated in length.

10. In a film printer machine by means of which photographic films are supported and transported together, apparatus comprising: a pair of spaced-apart plate-like members is face-to-face relationship and between which the films are disposed, each of said members having rows of orifices therethrough through which air is forced and slots between the rows for facilitating a flow of air from between said members, said orifices being shaped and oriented to direct the air orthogonally against the films, some of the orifices in each row being recessed to form a single elongated recess, each of said members further including a slit through it and a transparent element mounted over the slit for the passage of light through said member; and means mounted on each of said members for supplying air under equal pressure to the orifices thereof, said means, together with its associated member, forming a chamber into which the air is forced for substantially equal distribution to the orifices coupled thereto, said means including another transparent element mounted in the chamber wall thereof that is aligned with said slit to form an uninterrupted light path.

11. A system for simultaneously printing on several unexposed reels of film the information recorded on a reel of processed film, said system comprising: means for moving the processed film in a loop between supply and take-up reels; several printing mechanisms spaced around said loop, each mechanism including a pair of spaced-apart plate-like members in face-to-face relationship with the processed film passing therebetween, each member having rows of orifices therethrough and slots between the rows, some of the orifices in each row being recessed to form a single elongated recess, each of said members further including a slit through it and a transparent element mounted over the slit for the passage of light through said member, each mechanism further including means mounted to each of said members for supplying air under pressure to the orifices thereof, said means forming a chamber into which the air is forced for distribution to the orifices coupled thereto, said means including another transparent element mounted in the chamber wall thereof that is aligned with said slit; and several unexposed film supply and take-up reel arrangements respectively located at the several printing mechanisms, the unexposed film of each such arrangement passing between the pair of members of the proximate printing mechanism.

12. A system for simultaneously printing on a plurality of unexposed reels of film the information contained on a single reel of processed film, said system comprising: a plurality of printing mechanisms spaced apart from each other, each mechanism including a pair of plate-like members in face-to-face relationship and constructed so that air under pressure can be blown through them at a number of points thereon, the reel of processed film passing between each pair of members in said plurality of printing mechanisms, apparatus for blowing air under pressure through said pair of members and toward the film, and means in said members and said apparatus by means of which a beam of light is passed through said members; and a plurality of unexposed film arrangements respectively located at the plurality of printing mechanisms, the unexposed film of each such arrangement passing between the pair of members of the proximate printing mechanism, the air blown through said members pressing the processed and unexposed films together; and drive means for moving the processed film between the members of said printing mechanisms, whereby said unexposed films move in unison with it.

13. The system defined in claim 12 wherein said system further includes a manifold arrangement for supplying said pressurized air equally to each pair of members and to each member therein; and equipment for supplying cleansed air under said pressure to said manifold arrangement.

References Cited by the Examiner

UNITED STATES PATENTS

| | | | |
|---|---|---|---|
| 1,725,944 | 8/29 | Thompson | 95—75 |
| 1,828,364 | 10/31 | Garbutt | 95—75 |
| 2,037,806 | 4/36 | Little | 226—97 |
| 2,848,820 | 8/58 | Wallin et al. | 226—97 X |
| 3,103,850 | 9/63 | Khoury et al. | 226—95 X |
| 3,122,295 | 2/64 | Davison et al. | 226—95 X |

EVON C. BLUNK, *Primary Examiner.*